United States Patent [19]
Johnson et al.

[11] 4,160,069

[45] Jul. 3, 1979

[54] ELECTRICALLY CONDUCTIVE AND CORROSION RESISTANT CURRENT COLLECTOR AND/OR CONTAINER

[75] Inventors: Owen W. Johnson; Gerald R. Miller, both of Salt Lake City, Utah; Paul S. Beutler, Richland, Wash.

[73] Assignee: University of Utah, Salt Lake City, Utah

[21] Appl. No.: 769,997

[22] Filed: Feb. 18, 1977

Related U.S. Application Data

[63] Continuation-in-part of Ser. No. 658,975, Feb. 18, 1976, abandoned.

[51] Int. Cl.$^2$ .................................................. H01M 6/20
[52] U.S. Cl. ....................................... 429/104; 429/163
[58] Field of Search ............... 429/104, 163, 101, 102, 429/103

[56] References Cited

U.S. PATENT DOCUMENTS

| 3,404,035 | 10/1968 | Kummer et al. ...................... 429/104 |
| 4,002,807 | 1/1977 | Ludwig ................................. 429/104 |
| 4,020,246 | 4/1977 | Seo et al. ............................. 429/104 |
| 4,024,320 | 5/1977 | Gibson et al. ........................ 429/104 |

Primary Examiner—Donald L. Walton
Attorney, Agent, or Firm—Trask & Britt

[57] ABSTRACT

An improved electrically conductive current collector suitable for use in high temperature applications in the presence of corrosive environments comprising: (A) a high strength, noncorrosive electronically conductive ceramic member which serves as the primary load bearing element for said current collector; and (b) a highly electronically conductive metal cladding intimately attached to a substantial portion of one surface of said ceramic member and adapted to direct current flow through said ceramic member and to shunt said current between said member and an external contact. The disclosed current collectors are ideally suited for use as current collectors and current collector/containers for electrical conversion devices such as the sodium/sulfur battery and the like. Also disclosed are two processes for preparing tantalum or niobium doped rutile titanium dioxide. The electronically conductive ceramics produced using these methods are ideally suited for use as the ceramic in the disclosed current collector.

18 Claims, 5 Drawing Figures

ELECTRICALLY CONDUCTIVE AND CORROSION RESISTANT CURRENT COLLECTOR AND/OR CONTAINER

The invention herein described was made in the course of or under a contract or subcontract with the National Science Foundation.

This application is a continuation-in-part of U.S. Pat. application Ser. No. 658,975, filed Feb. 18, 1976, now abandoned.

BACKGROUND OF THE INVENTION

1. Field of the Invention

This invention relates to an improved electrically conductive current collector suitable for use in high temperature applications in the presence of corrosive environments.

More particularly this invention relates to an electronically conductive current collector or current collector/container for use in energy conversion devices such as the sodium-sulfur battery.

Still more particularly this invention relates to two methods for preparing electronically conductive rutile titanium dioxide which is ideally suited for use in the current collector of the invention.

2. Prior Art

There are a number of electrical applications involving various energy conversion devices in which the current collector of the device is exposed to an extremely corrosive environment. For example in energy conversion devices of the type comprising a molten cathodic reactant such as sodium polysulfide, the selection of a suitable current collector as well as a suitable container has been a source of considerable concern.

Previously, one of the prime candidates to date for use as a current collector material or current collector/container for such devices has been certain noncorrosive metals. However, metal systems, both pure and alloyed, often exhibit the phenomenon of severe plastic deformation under stresses. Such stresses are common in energy conversion devices due both to forces applied to the system from external sources and forces arising within the system, including those from expansion and contraction under thermal cycling as the system operates. Furthermore, the high operating temperature of such systems restricts the use of any metal whose melting point or point of plastic deformation approximates such temperatures, without respect to application of the aforementioned forces. For this reason and because of severe corrosion problems, many metals are not practical for use in such high temperature or corrosive (oxidative) environments.

Since the thermodynamic stability of ceramic materials such as oxides and sulfides in the presence of corrosive environments is well established and since it is also known that the thermodynamic stability of such materials is maintained to temperatures much higher than is compatible for metal systems, it has been suggested to employ a ceramic coating on the metal load bearing element of the aforementioned metallic current collector or container. Where a metal system operates as the load bearing element and includes such a protective covering separating the metal from the corrosive substance, the selection of a suitable covering must be made from materials which (1) are noncorrosive and impermeable to the corrosive substance, (2) adhere well under conditions of thermal cycling and (3) have sufficient electronic conductivity.

Often times a thermal expansion mismatch between the attached metal and ceramic covering results in fractures, microcracks and eventual spalling of the ceramic coating from the metal load bearing member. In addition to the limitations caused by mechanical incompatibility, considerable difficulty in applying the ceramic coating has been experienced. Conventional methods of application such as anodizing, for example, often result in an insulative rather than a conductive coating. In summary, the concurrent development of the requisite noncorrosive character, good adherence, and adequate conductivity in a coating which will be mechanically compatible under recurring cycles of thermal expansion has long presented a difficult challenge in this field of art.

Figure 1:
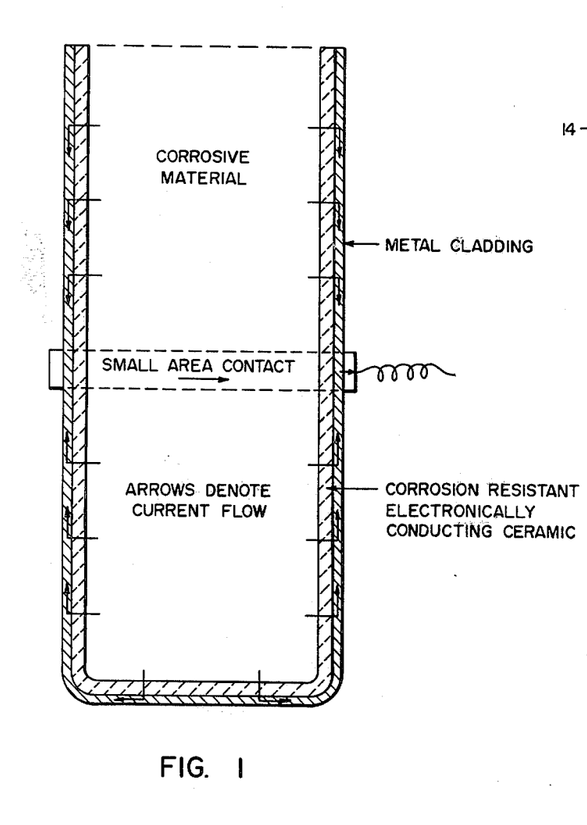
FIG. 1 shows one embodiment of the current collector in accordance with the invention.

In view of the above discussed inherent limitations of current collecting systems comprising a metal load bearing element with a corrosion resistant ceramic coating, the use of corrosion resistant ceramic per se has been suggested. However, the vast majority of useful ceramics are electrical insulators, thus making them unsuitable for current collection purposes. The utility of ceramics as insulative material is disclosed, for example, in Kummer, et al U.S. Pat. No. 3,404,035, which discusses the use of ceramics as a containing member in an electrical conversion system. This insulative character, in fact, is incorporated as an essential element for enabling effective operation of the system (FIG. 1).

Kummer, supra, also discloses the use of a metal covering in combination with insulative ceramic (FIG. 4); however, this application does not relate to the present invention. Kummer's use of a metal covering is necessitated because of the fragile nature of the ceramic chosen for the system, i.e., glass. The metal functions solely as a protective covering for the glass and is not a part of the electronically conductive circuit. Not only does the metal not function as a current collector, but the glass with which it is used is not operable as an electronically conductive medium. Instead, Kummer uses conventional graphite cathode or anode means to close the circuit of the energy conversion device.

A limited class of ceramics are known to be conductive in the metallic sense, but are not economically attractive. A larger class of ceramics can be made moderately conductive, but with conductivities which are much less than metals. Consequently, a current collector constructed of an electronically conductive ceramic of the latter group will exhibit a much higher resistance than that of a similarly shaped metal current collector.

It is therefore an object of this invention to provide a current collector and/or container which possesses the concurrent characteristics of being (1) noncorrosive and impermeable to corrosive substances (2) electronically conductive and (3) mechanically stable when subjected to thermal cycling.

BRIEF DESCRIPTION OF THE INVENTION

The above object is accomplished by the invention disclosed and claimed herein, which invention is an improved electrically conductive current collector suitable for use in high temperature applications in the presence of corrosive environments, comprising:

(A) a high strength, noncorrosive, electronically conductive ceramic member which serves as the primary load bearing member for said current collector; and (B) a highly electronically conductive metal-cladding intimately attached to a substantial portion of one surface of said ceramic member, said metal-cladding having a thickness which preserves the function of said ceramic member as the primary load bearing element of said current collector and, being based on the relative elastic modulus of said metal compared to that of the ceramic member, said metal-cladding being adapted to direct current flow through said ceramic member and to shunt said current between said member and an external contact point.

The above object is still further accomplished by the two methods for producing a high strength, noncorrosive, electronically conductive polycrystalline titanium dioxide ceramic members exhibiting high resistance to thermal shock and uniform grain size with an average grain size of less than about 25 micrometers and consisting of titanium dioxide in the rutile crystallographic form doped with a homogeneously distributed ionic metal species selected from tantalum and niobium. The first of these methods generally comprises:

(A) Dissolving in a solvent selected from water and aliphatic alcohols the pentafluoride salt of said metal species in an amount adapted to provide from about 0.01 to about 8 atomic percent of said metal species in said ceramic member;

(B) adding titanium dioxide powder in either the rutile or anatase form to the solution of (A) to produce a mixed slurry;

(C) Drying said slurry to powder form at a temperature adapted to avoid evaporation of said metal species, (D) green forming said powder to the desired shape;

(E) Heating the shaped green body to about 350° C. at a rate of at least about 10° C. per minute;

(F) Sintering said shaped green body at a temperature of at least about 1330° C; and (G) Annealing said sintered shaped body in a reducing atmosphere having an oxygen partial pressure of about $10^{-5}$ to about $10^{-25}$ atmospheres at a temperature of from about 850° C. to about 1400° C. to increase the conductivity of said ceramic member.

The second such method comprises:

(A) Dispersing a mixture of a pentachloride-diethyletherate complex of said metal species and titanium dioxide powder in either the rutile or anatase form to form a slurry, said slurry components being included in amounts adapted to provide from about 0.01 to about 8 atomic percent of said metal species in said ceramic member;

(B) Drying of said slurry to powder form at a temperature adapted to avoid evaporation of said metal species;

(C) green forming said powder to the desired shape;

(D) Heating the shaped green body to about 500° C. at a rate of at least about 40° C. per minute;

(E) Sintering said shaped green body at a temperature of at least about 1330° C; and (F) Annealing said sintered shaped body in a reducing atmosphere having an oxygen partial pressure of about $10^{-5}$ to about $10^{-25}$ atmospheres at a temperature of from about 850° C. to about 1400° C. to increase the conductivity of said ceramic member.

DESCRIPTION OF THE DRAWINGS

The invention will be more fully understood from the following detailed description of the invention taken in conjunction with the drawings in which.

DETAILED DESCRIPTION OF THE INVENTION

As discussed briefly above the current collector of this invention comprises the combination of an electronically conducting ceramic oxide, which forms the load bearing element of the current collector and which is corrosion resistant to the substances to which the current collector is to be exposed at elevated temperatures, with a metal conductor intimately attached to the ceramic with negligible electrical resistance at the ceramic metal interface.

Extreme importance must be attached to the concept of using the ceramic as the load bearing element in this construction. By maintaining a relatively thin metallic coating which normally is plastically deformable compared to the ceramic, deformation of the ceramic, as for instance through thermal expansion, causes the metal to flow. The inverse design where the metal is thick compared to the conducting ceramic will require plastic flow of the ceramic in order to maintain mechanical and electrical integrity at their interface, a condition difficult to achieve with the normally brittle ceramic.

The usefulness of the design is predicated on the existence of available materials which can be processed in strict accordance with the aforementioned design requirements and which are compatible with one another in the sense of intimate contact and adherence of the metal to the electronic ceramic and small or negligible contact resistance between the metal and electronic ceramic. Suitable highly conductive ceramics may be prepared in accordance with known prior art techniques.

Preparation of highly corrosive oxide ceramics is accomplished in the art by four commonly accepted methods: (1) intrinsic high conductivity, (2) reduction of the oxide ceramic causing a deficiency in oxygen ions and subsequent electrical compensation by the addition of conducting electrons, (3) controlled addition of an ionic species differing from the solute cationic species in both constitution and electric charge, the added species occupying an interstitial crystal site, charge neutrality considerations creating conducting electrons and higher conductivity, and (4) controlled addition of an ionic species differing from the solute cationic species in both constitution and electric charge, the added species occupying by substitution the sites of the parent cationic species with charge neutrality considerations producing conducting electrons.

Intrinsic high conductivity is exhibited by ruthenium oxide, a compound normally considered uneconomical because of the rare occurrence of ruthenium in nature. Methods (2) and (3) normally result in the creation of charged, mobile atomic entities which can move easily under the force due to an electric field. Method (4) offers the greatest promise for applicability in the current collector described in that the addition of impurity ions in a substantial manner usually produces a nearly immobile impurity except at very high temperatures.

Three economically viable metal oxides which may be made conducting and which are economically viable because of natural abundance are calcium titanate ($CaTiO_3$), strontium titanate ($SrTiO_3$) and one of the derivatives of both titanates, titanium dioxide ($TiO_2$) in the rutile crystallographic form. Common substitutional additive ions for all of these oxides include iron in the $+3$ oxidation state and aluminum in the $+3$ oxidation state. Greater electronic conductivity increase may be accomplished by the addition of an ionic metallic species having a stable valence in said ceramic of at least $+5$. Tantalum in the $+5$ oxidation state or niobium in the $+5$ oxidation state are preferred because of the solubility of these elements and because the charge carriers created from the niobium or tantalum impurity additions remain nearly free for electronic current flow.

By far the most common prior art method of adding niobium or tantalum to these metal oxides, when the resulting ceramic is to be polycrystalline, is the simple mixture of fine powders of niobium pentoxide ($Nb_2O_5$) or tantalum pentoxide ($Ta_2O_5$) with fine powders of the solute substance $CaTiO_3$, $SrTiO_3$ or $TiO_2$. Subsequent processing by commonly known arts of pressing the mixed powders into green ceramic form and sintering at a suitable temperature yields a black, dense ceramic with conductivity drastically enhanced over the pure solvent.

Grain size is generally very nonuniform coincident with the inhomogeneous distribution of the impurity in the solute. That is, the tantalum or niobium is not distributed in a homogeneous fashion, the large ceramic grains contain smaller amounts, the smaller grains existing as such because tantalum and niobium tend to serve as grain growth inhibitors. Excessive heating at very high temperatures may be employed to further homogenization but at the expanse of further grain growth and excessive processing costs.

Barium titanate, homologous to calcium titanate and strontium titanate, may be formed as a powder and intimately mixed with tantalum oxide or niobium oxide by a gel process described in U.S. Pat. No. 3,330,697. Even if this method is extendable to $CaTiO_3$, $SrTiO_3$ and $TiO_2$, a need exists to simplify the powder preparation process for economic reasons when large quantities of conducting ceramic are required.

Relative abundance of $CaTiO_3$, $SrTiO_3$ and $TiO_2$ makes these materials attractive for use in corrosion resistance, electronically conducting current collectors provided these materials may be processed at low cost and exhibit electronic conductivities adequate for the planned use of the current collector. Of special interest is the use of electronically conducting $CaTiO_3$, $SrTiO_3$ and $TiO_2$ as materials for a current collector or current collector/container for the sodium-sulfur battery. The above ceramic oxides not only may be made electronically conducting in the sense that resistivities at room temperature are less than 50 ohm-centimeters but also are known to be resistant to corrosive attach by commercial and/or electrolytic grade solium polysulfides at 400° C. or below.

Disc shaped samples of about one and one fourth inch diameter and one eighth inch thickness have been formed and sintered for the following chemical compositions and tested for corrosion resistance.

(1) $TiO_2$ (rutile) containing 1% tantalum
(2) $SrTiO_3$ reduced in water vapor atmospheres
(3) $CaTiO_3$ containing 3.0% iron
(4) $La_{0.84}Sr_{0.16}CrO_3$ with no additives Also, a single crystal sample of $TiO_2$ (rutile) containing 0.05 percent tantalum has been subjected to the corrosion tests above, which are performed by the method of recording the initial sample weight, subjecting the sample to the sodium polysulfides (in either commercial grade or electrolytic grade quality) at 400° C. by immersion for 14 days and subsequently weighing the cleaned samples after immersion for detection of weight loss or weight gain due to corrosive reactions with the sodium polysulfides. All of the above-named samples exhibited either no weight change or a very small change after the above tests (see table below) indicating good corrosion resistance to these liquids.

| Material | Form | Weight Change in Sodium Sulfide at 400° C. (PCT) after 14 days |
| --- | --- | --- |
| $CaTiO_3$ + 3.0% Fe | Sintered | −1.45 |
| $SrTiO_3$ -reduced | Sintered | −.141 |
| $SrTiO_3$ | Sintered | −6.0 |
| $TiO_2$ + 0.5% Ta | Single Crystal | 0 |
| $TiO_2$ + 1.0% Ta | Sintered | 0 |

The ideal electronically conductive ceramics for use in this invention are the tantalum and niobium doped titanium dioxides prepared in accordance with the two methods of this invention which will be more fully discussed hereinafter.

As noted above the construction criteria for a corrosion resistant electronically conducting, metal clad ceramic current collector requires the addition of a thin, metal cladding intimately attached to the surface of the corrosion resistant, electrically conducting ceramic. The thickness and resistivity of both ceramic and metal is adjustable to give a very wide range of total current collector electrical resistance. Broadly the ceramic may have an electrical resistivity of less than about 1000 ohm-cm, but preferably the resistivity should be less than 50 ohm-cm and most preferably less than 10 ohm-cm. Broadly, the resistivity of the metal may be as high as 0.001 ohm-cm, but preferably is less than about 0.0003 ohm-cm and most preferably less than about 0.0001 ohm-cm. The geometrical sizes and shapes of the respective metal and ceramic components, particularly their thickness, may be varied along with resistivities to produce a current collector of specified total resistance.

In the intended uses of the current collectors of this invention the ceramic surface is the only surface to contact corrosive substances. As depicted in FIG. 1, corrosive material is retained within a container composed of the inner ceramic member and outer metal cladding, thereby precluding corrosive contact with the metal. When the metal cladding is in intimate electrical and mechanical contact with the outer surface of the electronically conductive ceramic, current flow will traverse the ceramic through the path of least resistance. In FIG. 1, this current flow is perpendicular to and through the ceramic wall to the metal cladding. This structure provides for minimum resistance, thereby reducing energy consumption and waste. Because of the negligible resistance of the metal, current is shunted to the circumscribing point of contact. As a result a metal placed on one surface of the ceramic will not be exposed to the corrosive materials contacting the other ceramic surface. Such a metal placed in intimate electrical and mechanical contact with one of the surfaces of an electronically conducting, corrosion resistant ceramic can serve to shunt electrical current through a region of metallic conductivity. In essence, electronic current must then only pass perpendicular to and through the ceramic container walls to the metal shunt, rather than pass through the ceramic parallel to the container walls. This concept (FIG. 1) can serve to drastically lower the total inner area to small outer area resistance of such a containing device while maintaining the corrosion resistance of the ceramic. The metal placed in intimate contact on the outer surface of the ceramic is referred to as metal cladding.

For a container of length 23 centimeters, ceramic wall thickness of 0.2 centimeters, diameter of 4.0 centimeters, metal cladding thickness of 0.02, centimeters, ceramic resistivity of 0.2 ohm-centimeters and metal resistivity of $10^{-5}$ ohm-centimeters, the total resistance of the given configuration is less than 0.6 milliohms. A container with the same dimensions which does not have the metal cladding attached will have a resistance of about 1 ohm, 1500 times greater than the same container with the metallic cladding.

The metal-ceramic combination must possess the characteristics of corrosion resistance, high electronic conductivity for the ceramic and the ability of the metal coating to be intimately placed onto a surface of the ceramic with negligible contact resistance between the electronic ceramic and the metal. Furthermore, the metal must not readily oxidize below 400° C., thereby causing the subsequent electrical degradation of the metal-ceramic interface.

Satisfactory materials for such cladding include but are not limited to aluminum, nickel, chromium and silicon and combinations of these substances, A primary common characteristic of such materials which tend to preserve good interface conductivity is the tendency to form thin oxides on the outer surface of the metal cladding. High contact resistance between metallic or semiconducting cladding materials resulting from poor surface preparation may be eliminated by preheating the ceramic in vacuum or reducing atmospheres before conveniently applying the metallic coating.

The following metal-ceramic combinations have demonstrated the aforementioned necessary characteristics:
  (1) Tantalum doped rutile ($TiO_2$) covered with a metal cladding of (either sputtered, electrolytically or chemically deposited) nickel.
  (2) Tantalum doped rutile ($TiO_2$) covered with a metal cladding of aluminum.
  (3) Tantalum doped rutile ($TiO_2$) covered with a metal cladding of chromium.
  (4) Tantalum doped rutile ($TiO_2$) covered with a thin cladding of silicon (overcoated with metallic platinum).
  (5) Niobium doped rutile covered with a metal cladding of platinum.
  (6) Iron doped calcium titanate covered with a coating of gold.
  (7) Reduced strontium titanate covered with a coating of gold.
  (8) Lanthanum strontium chromite ($La_{0.84}Sr_{0.16}CrO_3$) covered with a metal cladding of platinum.

Samples of several of the above materials were prepared and tested. $TiO_2$, sputtered nickel, sputtered aluminum and sputtered silicon overcoated with platinum exhibit no apparent electrical resistance increase or degradation when applied with a thickness of about 2000A and cycled to 500° C. for 10 hours. Rutile titanium dioxide doped with either tantalum or niobium and electrolytically plated with nickel or chromium also exhibits no degradation as measured by changes in apparent electrical resistance after cycling to 500° C. for 10 hours and remeasuring the composite conductance at room temperature, a temperature condition where contact resistance is larger than at the higher temperatures of expected application. Similar behavior is noted for vapor deposited gold on the surface of rutile doped with niobium, vapor deposited gold on the surface of calcium titanate and vapor deposited platinum on the surface of lanthanum strontium chromite ($La_{0.84}Cr_{0.16}CrO_3$). The electrical resistance change is monitored by the common two probe method of measurement.

Each of the aforementioned materials in nearly pure form is easily processed by the common arts of ceramics, whereby powders are compacted to form a green shape and sintered at elevated temperatures where densification occurs. Densities of above 98 percent of the theoretical values are easily obtained for all materials. The total time the sample is maintained at the temperature of sintering as well as the temperature of sintering can be varied to suit the needs of the processor and to vary the subsequent properties of the material. The addition of impurities to the nearly pure materials normally causes required changes in the processing technique especially in so far as the homogeneous distribution of impurities is desired.

As mentioned previously the ideal high strength, noncorrosive, electronically conductive polycrystalline ceramic for use in preparing the current collectors of the invention may be prepared in accordance with the following methods. The ceramics are titanium dioxide in the rutile crystallographic form which is doped with a homogeneously distributed ionic metal species selected from tantalum and niobium. This homogeneous distribution of dopant is a result of the processes employed and results in ceramics having excellent properties including high resistance to thermal shock, uniform grain size and an average grain size of less than about 25 micrometers.

The first of the two processes comprises:
(A) The formation of a slurry of titanium dioxide in either the rutile or anatase crystallographic forms in water solution (or aliphatic alcohol solution) of tantalum or niobium pentafluoride. The weights of titanium and the pentafluoride salt constituent will be determined by the desired final concentration of dopant in the titanium dioxide. In general, it is desirable to provide from about 0.01 to about 8 atomic percent of the ionic metal species in the sintered ceramic. It will be appreciated that the amount of dopant which may be added with continuous electrical property enhancement of the $TiO_2$ due to homogeneous tantalum or niobium distribution is ultimately limited by the solubility of tantalum or niobium in $TiO_2$, but certainly quantities of up to 3 percent Ta or Nb on a titanium ion basis are possible. For no tantalum or niobium percentage should the sum of all percentages of cationic impurities of normal ionic charge less than +4 or greater than +5 be greater than about 0.10 percent; and concurrent with this restriction, the sum of all percentages of cationic impurities of ionic charge less than +4 or greater than +5 should not exceed 10 percent of the added tantalum concentration. Impurity levels greater than these mentioned serve to drastically limit the attainable conductivity resulting in a highly inefficient use of the tantalum pentafluoride additions.

(B) The slurry is next dried to powder at a temperature adapted to avoid evaporation of the metal species. The drying of the slurry is generally accomplished by slowly heating to a temperature of not more than 110° C. and should be accomplished in a time of not more than 10 hours. Stirring of the slurry enhances the rate of drying. During this process addition of a suitable binder useful in green forming of the ceramic body may be accomplished. Pentafluoride salts of the metal ion which remains after drying, melts at temperatures less than 100° C. and the vapor pressure of the substance rises to an unreasonably high value before the drying slurry reaches 130° C. Long term heating at temperatures above 120° C. results in the evaporation loss of the pentafluoride when experimental conditions are equivalent to open container heating.

(C) The powder with water removed is pressed into a suitable or desired form and sintered at elevated temperatures in air or oxygen with critical heating rate of at least 10° C. per minute maintained between ambient and 350° C. to prevent loss of tantalum or niobium via a vaporization process. Above 350° C. oxidation of tantalum or niobium and fluorine to succeedingly more stable oxides occurs, each succeeding form being less susceptible to vaporization loss until the final form of tantalum or niobium pentoxide is reached and which is stable to vaporization loss throughout common sintering temperature ranges. A wide range of final sintering temperatures and holding times at the sintering temperature may be useful to those skilled in the arts of ceramic processing. A temperature of at least about 1330° C. and more preferably a range of about 1380° C. to about 1440° C. may be used. However, the preferred conditions for optimal densification, homogenization of the tantalum or niobium ion by diffusion into the rutile powders and minimization of uniform grain size is about 1400° C. for approximately 3 hours. A minimum temperature of 1330° C. is required for reasonable rates of homogenization. These above-stated conditions apply to the processing regardless of the quantity of tantalum or niobium fluoride added to the rutile. The resulting dense material may be cooled to room temperature from 1400° C. in as little as 10 minutes for samples containing 1 percent tantalum or niobium. Cooling rates must decrease for samples with decreasing percentages of tantalum additive.

The above-stated method is conducive to the fabrication of highly conductive tantalum or niobium doped rutile in a batch sintering mode and may be subjected to many minor modifications to suit available processing apparatus. Samples of dried $TiO_2$ powders in both the rutile and anatase forms and under several forming conditions may be processed with the method described including about 1 atom percent of Ta and produce very nearly identical values for properties of electrical conductivity (i.e. about 1 mho/cm), uniform grain size less than 25 micrometers, fracture strength of 18,000 psi or greater and density greater than 98 percent of the theoretical density of $TiO_2$ in the rutile form. Some variations of processing methods, starting $TiO_2$ powders and green forming methods are discussed in specific examples will make this point clear.

The second method of processing $TiO_2$ and small percentages of tantalum or niobium additive into a highly conducting, thermally shock resistant ceramic with uniform grain size of less than 5 micrometers and fracture strength of 18,000 psi or greater comprises:

(A) The addition of tantalum or niobium pentachloride to diethyl ether to form the molecular complex tantalum or niobium pentachloride diethyletherate, with any excess ether to serve as a liquid into which $TiO_2$ powder in either the rutile or anatase form may be stirred to form a slurry. Constant stirring causes the ether to evaporate rapidly at room temperature leaving essentially dry, mixed powders to which a binder may be added. This simple method is ideally suited for rapid, continuous raw material preparation. At this stage of processing, the concentration of tantalum or niobium is adjusted by varying the amount of tantalum or niobium pentachloride used to react with the diethyl ether. As in the first method, it will be appreciated that the amount of tantalum or niobium which may be added with continuous electrical conductivity enhancement of the rutile due to homogeneously distributed tantalum or niobium is ultimately limited by the solubility of the metal species in $TiO_2$, but certainly quantities of up to 3 atomic percent are possible. For no tantalum or niobium percentages should the sum of all percentages of cationic impurities of normal ionic charge less than +4 or greater than +5 exceed 10 percent of the added tantalum or niobium concentration. Impurity levels greater than these mentioned serve to drastically limit the attainable conductivity resulting in a highly inefficient use of the tantalum or niobium pentachloride additions. The resulting mixed powders may not be dried at temperatures exceeding 65° C. for times exceeding a few minutes due to the loss of tantalum or niobium by vaporization of $TaOCl_3$, a product of the tantalum chloride diethyletherate decomposition at 65° C. or the comparable niobium compound.

(B) The powder with a suitable binder is pressed into a suitable form and sintered at elevated temperatures in air or oxygen with a critical heating rate of at least 40° C. per minute maintained between ambient and 500° C. to prevent loss of tantalum or niobium via vaporization processes. Above 500° C., more stable oxides of tantalum or niobium and chlorine form and are less susceptible to vaporization, the final form being tantalum or niobium pentoxide which is stable to vaporization loss throughout the common sintering temperature ranges. The methods, ranges of sintering conditions, cooling rates and properties are very similar to the first method of preparation except that the grain size is uniform at 5 micrometers or less and has fracture strength of greater than 18,000 psi.

For either of the above methods, in order to produce rutile doped with tantalum or niobium of repeatable electrical characteristics an anneal of the ceramic in a relatively low oxygen pressure environment is useful. Such a reducing treatment serves to increase the conductivity of the sample to values as high as 5 (ohm-cm)$^{-1}$ at room temperature for material containing about 0.5% tantalum and 9 (ohm-cm)$^{-1}$ at room temperature for material containing 1 atom percent tantalum. The approximate range of useful oxygen partial pressures is from $10^{-5}$ to $10^{-25}$ atmospheres with the annealing temperature ranging from about 850° C. to about 1400° C. At the lower regions of this temperature range the annealing kinetics are slow, requiring several hours for completion, whereas at the upper regions of this temperature range, the anneal may be accomplished in approximately 30 minutes or less.

The optimum partial pressure for preparation of a corrosion resistant, highly conductive ceramic for efficient high current density use depends upon both Ta or Nb concentration and the temperature chosen for the annealing process. In general, the optimum partial pressure region is shifted to higher oxygen partial pressures for lower Ta or Nb concentrations and for higher annealing temperatures. It is clear that an anneal in a region of oxygen partial pressures so low as to produce Ta or Nb doped rutile in a reduced state, containing cation interstitials or oxygen vacancies, should be avoided. Such reduced material will exhibit drastically less corrosion resistance than material annealed correctly.

The approximate range of useful oxygen partial pressures for annealing Ta or Nb doped rutile is from $10^{-5}$ atmospheres to $10^{-25}$ atmospheres. For anneals in the lower temperature regions the lower oxygen partial pressures should be maintained; for the higher temperature anneals, the higher oxygen pressures should be maintained. Those skilled in the art can easily determine optimum times, temperatures, and oxygen partial pressures for the particular process applied.

Figure 5:
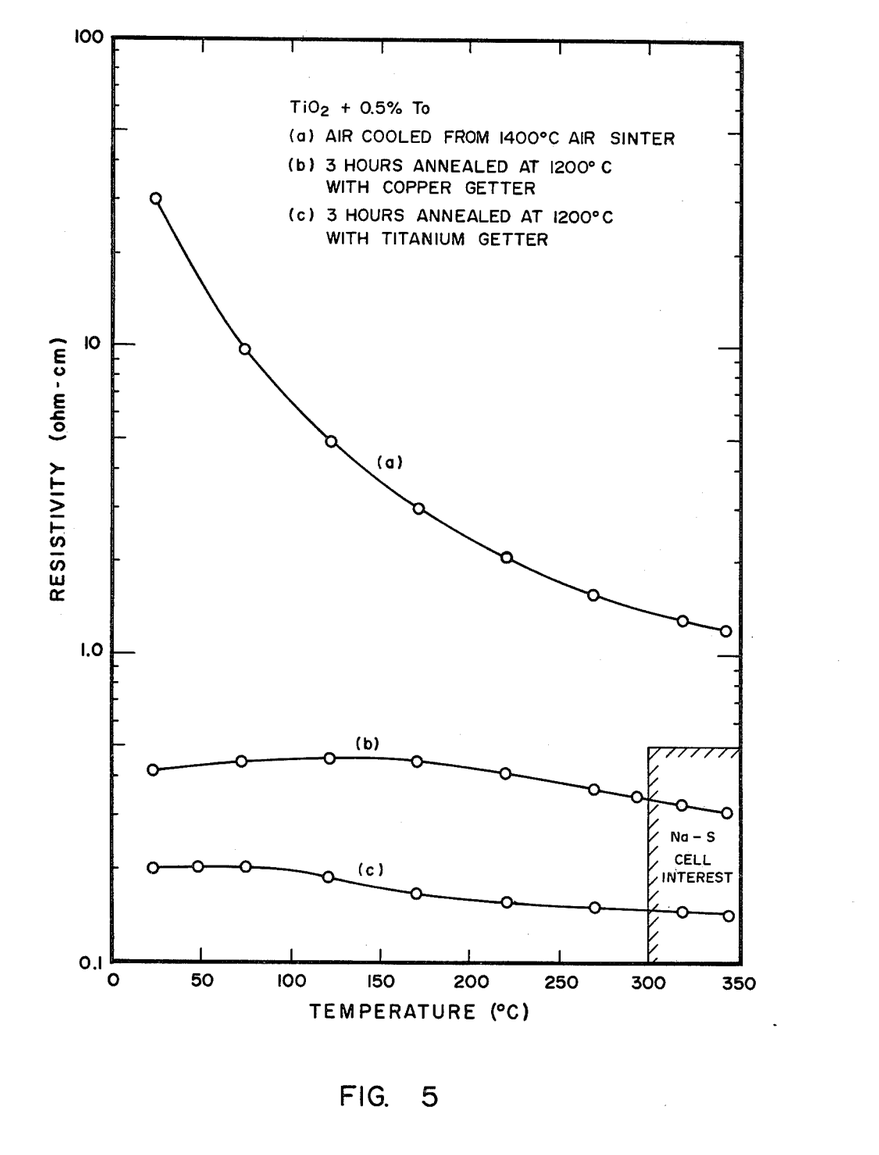
FIG. 5 graphically illustrates the effects of annealing.

Typically a material containing about 1 percent Ta or Nb may be annealed in oxygen partial pressures ranging from $10^{-10}$ atmospheres to $10^{-20}$ atmospheres at temperatures ranging from 850° C. to about 1250° C. For annealing at temperatures from about 1250° C. to 1400° C. the oxygen partial pressure should be kept above $10^{-15}$ atmospheres and less than $10^{-5}$ atmospheres for optimum material characteristics. After an optimum anneal, the conductivity of the ceramic containing from 0.1 to 3.0 atomic percent of Ta or Nb in the temperature range of amount to 350° C. is relatively independent of temperature. FIG. 5 is a graph showing the relationship between the resistivity of the ceramic and the annealing step.

As mentioned above, the current collectors prepared in accordance with this invention are useful as current collectors or as current collector/containers in energy conversion devices of the type comprising: (1) an anodic reaction zone containing a molten alkali metal reactant anode in electrical contact with an external circuit; (2) a cathodic reaction zone containing a cathodic reactant comprising a molten liquid electrolyte which is electrochemically reactive with said anodic reactant and a current collector at least one surface of which is exposed to said cathodic reactant; and (3) a cation permeable barrier to mass liquid transfer interposed between and in contact with said anodic and cathodic reaction zones, said current collector being in electrical contact with both said cation-permeable barrier and said external circuit. Such devices, the most common of which is the sodium/sulfur electrical storage cell are well known to those skilled in the art and are disclosed in the following U.S. Pat. Nos. 3,404,035; 3,404,036; 3,413,150; 3,446,677; 3,458,356; 3,468,709; 3,468,719; 3,475,220; 3,475,223; 3,475,225; 3,535,163 and 3,719,531.

Figure 2:
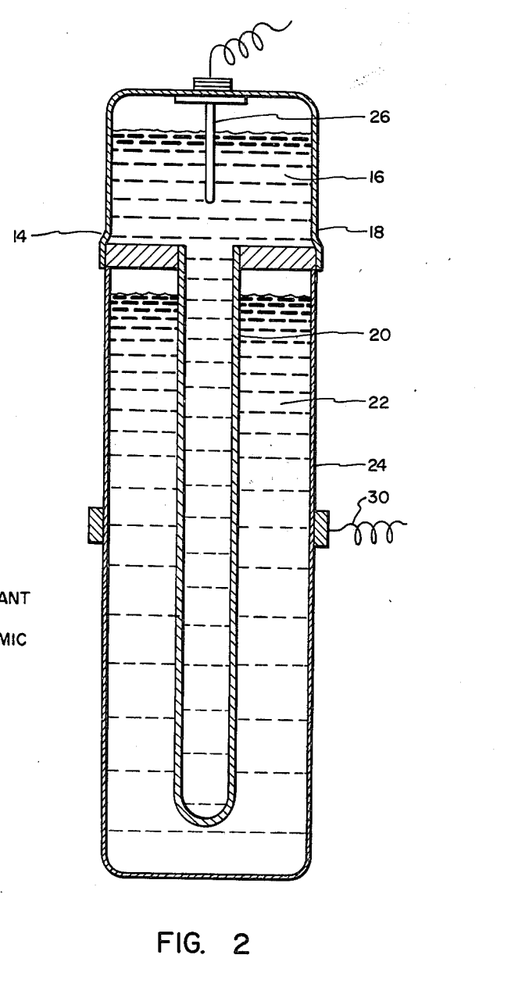
FIG. 2 shows an energy conversion device incorporating the current collector of the invention.

FIG. 2 shows a typical electrical conversion device of the above type wherein the current collector of this invention also serves as the container for the cathodic reactant and, in fact, for the entire cell. In the Figure a cell is generally indicated at 14. Such a cell may, of course, be one unit or a plurality of cells in series and/or parallel forming a battery. In the embodiment sodium 16, is shown within a tubular cation permeable barrier. In contact with the exterior of tube 20 is a porous conductor 22 immersed in the molten cathodic reactant electrolyte. Encasing both 20 and 22 is an electronically conducting metal clad cylindrical container 24 which be formed of the current collector material of this invention such that the interior surface thereof is conductive ceramic and the outside surface is metal cladding. In contact with the molten sodium 16, is a conductor 26, e.g., platinum wire, which serves as the negative lead to an external circuit, not shown, which includes a resistance, e.g., a light bult, D.C. motor, etc., and is an electrical connection with a positive lead, conductor 30. Lead 30 is in electrical contact with current collector/container. The sodium atoms of the anode-reactant 16 yield electrons to the conductor 26 and the ions pass through tube 20 to the cathodic reactant. Sulfur atoms within 22 accept electrons from the external circuit by cathode 24 and the porous conductor 22. In this particular embodiment, the porous conductor is shown as a fibrous sheet material fabricated from graphite or carbon fibers.

Figure 4:
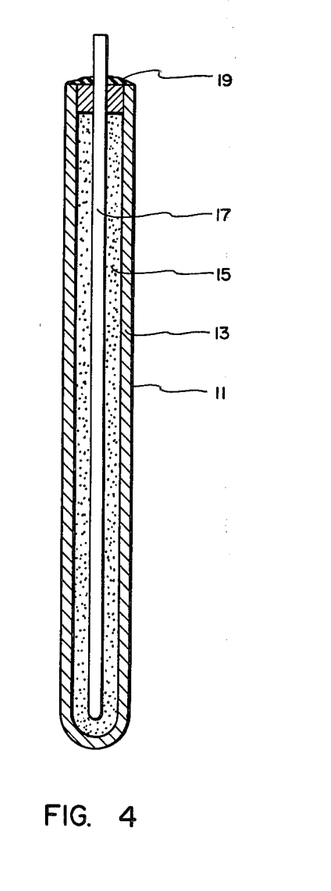
FIG. 4 shows the current collector employed in FIG. 3.

In another configuration of the above type of energy conversion device the current collector of the invention could be tubular or cylindrical in configuration with the exterior of said tubes or cylinder comprising the ceramic member and the interior of the tube or cylinder bearing the metal cladding. Such a current collector is then immersed in the cathodic reactant such that said ceramic member, but not the metal cladding is exposed to the cathodic reactant. The design shown in FIG. 2 could be modified to this type of design by inserting such a current collector directly into molten cathodic reactant within the cathodic reaction zone and employing a container which is not a current collector. Such a current collector design as would be suitable for such a use is shown in FIG. 4 wherein 11 is the electronically conductive tubular ceramic primary load bearing element and 13 is a thin layer of metal cladding substantially covering the interior of the ceramic tube. The current collector is shown adapted for making electrical contact with an external circuit. Conductive metal rod 17 (e.g., aluminum or copper) is disposed internally of said tube and extends through the open end thereof held in sealed relationship by seal 19. Contact is made complete between the current collector and rod 17 by a conductive powder 15 which fills the space between the rod 17 and metal cladding 13.

Figure 3:
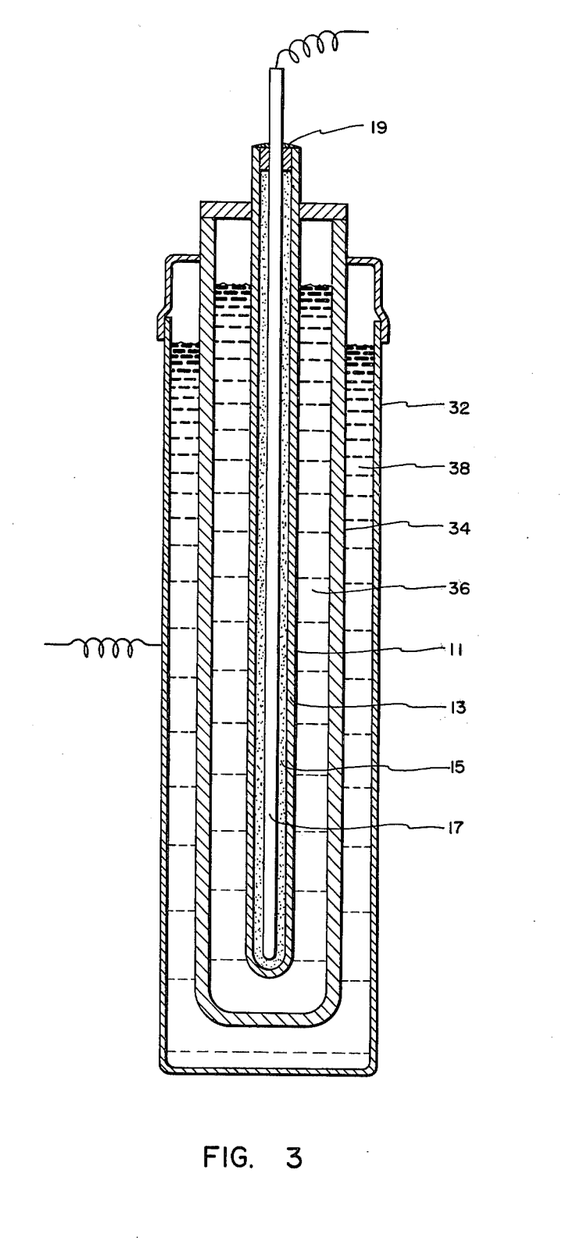
FIG. 3 shows another energy conversion device incorporating a current collector in accordance with the invention.

FIG. 3 shows still another design of the type of electrical conversion device described above and employing the current collector of the design shown in FIG. 4 and discussed above. In this design a cylindrical or tubular container 32 has a tubular cation permeable barrier 34 disposed internally thereof such that, as was the case in the design of FIG. 2, a first reaction zone is located internally of the cation permeable barrier 34 and a second reaction zone is located between the container 32 and the cation permeable barrier 34. However, in contrast to the cell of FIG. 2 in the cell of FIG. 3 the first reaction zone is the cathodic reaction zone, not the anodic reaction zone and contains cathodic reactant 36 rather than alkali metal. Alkali metal 38 is contained in the second reaction zone which is the anodic reaction zone rather than the cathodic as in FIG. 2.

The following specific examples will more fully illustrate the details of the design and construction methods of this invention.

EXAMPLE I

In order to produce 102.28 grams of $TiO_2$ powder containing 1 percent Ta cations, 3.49 grams of tantalum pentafluoride of 99+% purity on a metals basis is dissolved in 20 ml of water at about 25° C. in a polyethylene beaker. The solution is added to an ethyl alcohol slurry containing 100.0 grams of reagent grade $TiO_2$ powder in the anatase form while constantly stirring until the slurry becomes very viscous and nearly dry. The powder, still slightly wet, is placed in an oven at 100° C. for overnight drying.

To the dried powders is added 1 ml of a binder composed of a solution of polyvinyl alcohol (PVA) in water. The PVA-powder combination is ground in a mortar and pestle until apparently well mixed. The combination is then screened into nearly round pellet form by forcing the powder-binder combination through a sieve of 20 wires per lineal inch. Subsequently, the powders are poured into molds and pressed at about 20,000 psi after which they are prefired to a temperature of 950° C. During prefiring the elapsed time between ambient and 350° C. is less than about 35 minutes. The heating rate in this temperature range is approximately constant; the average heating rate is about 10° C. per minute. The green ceramic bodies are held at 950° C. for approximately 3 hours and then cooled in about 4 hours to room temperature.

The prefired ceramic bodies are placed on a small brick slab which has been coated with unpressed powders of the ceramic body composition and placed in a sintering furnace at 1000° C. The sintering furnace is composed of a tubular, nonporous aluminum oxide tube and aluminum oxide flat shelf and electrically heated by silicon carbide rods. The sample is introduced into the highest temperature zone of the furnace over a period of 5 to 10 minutes, after which the furnace is heated to a sintering temperature of 1400° C. in about 2 to 3 hours in air. The ceramic body is held at the sintering temperature for 3 hours and immediately removed by pushing the brick sample slab to the end of the furnace tube and placing in ambient air to cool.

The ceramic bodies are placed upon powders of Ta doped rutile within a tubular furnace, the ends of which are sealed with water-cooled rubber rings. The furnace is evacuated with a mechanical pump after which nitrogen gas with less than 8 ppm oxygen is passed over metallic titanium powder and through the furnace. The furnace temperature is raised to 1200° C. at the point of placement of the ceramic body and at 1050° C. at the point of placement of the metallic titanium powder. The temperatures are maintained for approximately 3 hours before slowly cooling over 8 hours to ambient.

The ceramic body is sectioned for density measurement by hydrostatic weighing and a section is removed for the addition of metal electrodes required for a determination of electrical resistivity and degradation of the metal-ceramic interface upon exposure to oxygen at various (higher than ambient) temperatures.

The conductivity of a sample treated by this method will be approximately 9 mho per centimeter at room temperature, increasing to 16 mho per centimeter or greater above 300° C. The fracture strength of ceramics prepared in this fashion, as measured by the 4 point bending test is greater than 18,000 psi.

It is speculated that uniform grain size and high electrical conductivity is largely due to the homogeneous distribution of tantalum in the rutile phase of $TiO_2$. Apparently the most critical step is the addition of a volatile fluoride and rapid prefiring to prevent its loss through vaporization.

EXAMPLE II

In order to produce 102.29 grams of $TiO_2$ powder containing, 4.5284 grams of tantalum pentachloride ($TaCl_5$) of 99.5+% purity on a metals basis is dissolved in 20 ml of diethyl ether in a pyrex beaker. This solution is added to a diethyl ether slurry of 100.0 grams of reagent grade $TiO_2$ powder in the anatase form. The combination slurry is then stirred for several minutes to assure mixing. Subsequently the slurry is poured into 5 inch diameter watch glasses from which the excess diethyl ether is allowed to evaporate. At no time is the temperature of the chemical system raised above ambient.

To the dried powders is added about 2 ml of fine carbon powder which is mixed with a mortar and pestle. Following this procedure about 2 ml of ethyl alcohol is added and mixed with a plastic spoon. The powders with the carbon and ethyl alcohol binder are screened into nearly round pellet form by forcing the powder binder combination through a sieve of 20 wires per lineal inch. The powders are then poured into molds and pressed at pressures of about 20,000 psi after which they are prefired to a temperature of 950° C. During prefiring the elapsed time between ambient and 950° C. is less than about 25 minutes. The average heating rate in this temperature range is about 38° C. per minute and greater than 40° C. per minute between ambient and 500° C. The green ceramic bodies are held at 950° C. for approximately 3 hours and then cooled in about 4 hours to room temperature.

The prefired ceramic bodies are placed in a small brick slab which has been coated with unpressed powders of the ceramic body composition and placed in a sintering furnace at 1000° C. The sintering furnace is composed of a tubular, nonporous aluminum oxide tube and aluminum oxide flat shelf and electrically heated by silicon carbide rods. The sample is introduced into the highest temperature zone of the furnace over a period of 5 to 10 minutes, after which the furnace is heated to the sintering temperature of 1400° C. in about 2 to 3 hours in air. The ceramic body is held at the sintering temperature for 3 hours nd immediately removed by pushing the brick sample slab to the end of the furnace tube and placing in ambient air to cool.

The ceramic bodies are placed upon powders of Ta doped rutile within a tubular furnace, the ends of which are sealed with water-cooled rubber rings. The furnace is evacuated with a mechanical pump after which nitrogen gas with less than 8 ppm oxygen is passed over metallic titanium powder and through the furnace. The furnace temperature is raised to 1200° C. at the point of placement of the ceramic body and at 1050° C. at the point of placement of the metallic titanium powder. The temperatures are maintained for approximately 3 hours before slowly cooling over 8 hours to ambient.

The ceramic body is sectioned for density measurement by hydrostatic weighing and microscopic examination and a section is removed for the addition of metal electrodes required for a determination of electrical conductivity.

The density of the ceramic body prepared in this way is greater than 4.10 grams per cubic centimeter, the electronic conductivity is greater than or about 9 mho per centimeter at 25° C. The very uniform grain size in a ceramic prepared in this fashion will be less than or about 5 micrometers and the corresponding fracture strength as measured by the 4 point bending method is greater than 18,000 psi.

It is speculated that small uniform grain size and relatively high electrical conductivity is largely due to the homogeneous distribution of tantalum in the rutile phase of $TiO_2$. Apparently the most critical processing step is the formation of $TaOCl_3$ upon decomposition of tantalum pentachloride diethyl operate 65° C. and the very rapid prefiring to prevent its loss through vaporization.

EXAMPLE III

Approximately 300 grams of dried rutile powders containing one percent tantalum or niobium are prepared as described in Example I or II and binders are added as described in Example I or II or by other common prior art techniques. The powders containing binder are screened using a standard 20 mesh sieve into nearly spherical pellet form.

The pelletized powder-binder mixtures are poured into a mold consisting of a central stainless steel mandrel onto which an appropriate mold release lubricant has been applied. Mold release compounds such as oleic acid, graphite powder, silicone oils and the like serve well as mold release agents. The outer mold surface is a cast polyurethane boot of hardness durometer 90. Holding the polyurethane boot in a rigid position with respect to the mandrel is a rust resistant metal outer tubing with perforations through which fluids may flow. Enough powder is added over the exposed end of the mandrel to produce a closed end ceramic container and a rubber stopper with stainless steel core is placed on the assembly for sealing.

The powder is compressed at a pressure of approximately 30,000 pounds per square inch in a commercial isostatic press. After removal from the mandrel-boot assembly, the green formed closed end tube body is prefired in a manner described in Example I or II respectively and sintered at 1400° C. in an air atmosphere for three hours upon discs of previously formed Ta or Nb doped rutile to prevent contamination. After cooling to ambient temperature, the tubular form is placed in a tubular annealing furnace upon Ta or Nb doped rutile supports. The furnace tube is composed of dense, non-porous alpha alumina or mullite of similar characteristics. The ends of the furnace have water cooled, circular ring seals for isolation from ambient atmosphere. At a predetermined position, a crucible containing titanium metal powder or chips is also placed in the tubular furnace before application of the ring seals. The furnace tube is evacuated with a mechanical forepump and flushed with nitrogen gas containing less than 8 ppm oxygen. The furnace is evacuated a second time and the nitrogen gas flow reintroduced and maintained. The furnace temperature is raised to 1200° C. in the region of the closed end tubular container and to 1050° C. in the region of the titanium powder or chips. These temperatures are held for about 3 hours before cooling the entire assembly to ambient in about 8 hours.

The annealed tubular form is filled with finely divided graphite powder and a copper rod of approximately 1 centimeter in diameter is placed in the graphite powder at the center of and spanning the axial dimensions of the tubular form. The graphite powder-copper rod-doped rutile tube is placed in a conventional nickel plating solution containing a metallic anode. Electrical contact to a direct current source is made to the anode and to the central copper cathode. Electrical current is allowed to flow at the rate of about 5 milliamperes per square centimeter for about one minute for initial plating of nickel. Subsequently the current is allowed to flow at higher rates, commonly at 50 to 100 milliamperes per square centimeter, until the desired metal cladding thickness is achieved.

EXAMPLE IV

A closed end ceramic tubular form is prepared as described in Example III except that the metal cladding is placed on the inner surface of the tubular form. In this case, the anode is placed in the center of the closed end ceramic tubular body and common nickel containing electrolytic solution is circulated between the ceramic inner surface and the metal anode. The outer ceramic surface is uniformly contacted by a graphite powder contained within a copper tube which is electrically contacted to a current source. Plating of the inner surface is accomplished as described in Example III.

To form an efficient current collecting device for contact to corrosive substances, a highly conducting metal rod or tubular conductor is concentrically placed in the center of the nickel plated tubular form. The outer surface of the highly conducting metal is contacted to the inner (plated) surface of the electronic ceramic tubular form by the insertion of metallic powders, metallic wires, graphite powders or metallic braiding material to form a device as depicted in FIG. 4. Care is taken to contact the metal coated ceramic in a spacially intermittant fashion so that the ceramic member remains as the load bearing element of the current collector system and is not constrained by the inner metal rod or metal tube.

EXAMPLE V

The following experiment gives credence to the supposition that certain spattered metal coatings applied to the surface of a conductive ceramic, retain good composite electrical characteristics at elevated temperatures.

A small bar-shaped sample of electrically conductive ceramic, prepared as described in Example I or II, is coated with aluminum by conventional r.f. sputtering techniques, using argon gas at a pressure of 10 to 20 millitorr as a sputtering agent. At a power level of 100 watts, with a 2 inch diameter aluminum cathode, and a cathode-to-target spacing of 1 to 2 inches, the sputtering is continued for 5 to 10 minutes, producing a uniform adherent layer of aluminum of approximately 2000Å thickness. All aluminum on the specimen except for four parallel grooves on one surface is mechanically removed from the specimen. Electrical contact with each of these aluminum coated grooves is then established with four conducting probes. Standard four terminal resistance measurement is then made permitting accurate determination of that part of the resistance between the two middle terminals due only to bulk resistance of the conductive ceramic, $R_B$. Standard two terminal measurement of resistance between the two middle terminals is then made. This resistance, $R_T$, (after well-known geometrical corrections) is then compared with the four terminal resistance, $R_B$, previously determined. The difference between these two values of resistance is the total contact resistance of the two middle terminals. With a specimen prepared as described, this contact resistance will be negligible (less than 10% of $R_B$). The sample may be heated to 500° C. in air for periods of at least 10 hours with no measurable change in contact resistance determined as described above.

This experiment, one should note, is performed under conditions whereby contact resistance increases are most easily observed. By applying only a thin metal cladding of 2000 angstroms instead of the relatively thick cladding required by the design, mass transport of material which degrades the contact to the metal-ceramic interface is enhanced. Further, by cycling the samples to high temperatures and measuring the contact resistance at ambient, one observes the degradation effect at its worst. Contact resistances are generally known to decrease as the temperature of the contact is increased. Thus a container operating at temperatures above ambient will show improved behavior over that observed in the manner of this experiment. Similar high temperature electrical degradation resistance is noted for samples prepared and tested in this fashion except that a thin sputtered layer of silicon is deposited and overcoated with a thin sputtered layer of platinum.

EXAMPLE VI

The following experiment gives credence to the supposition that certain electroplated metal coatings applied to the surface of a conductive ceramic as a current shunt, retain good composite electrical characteristics at elevated temperatures. A small bar-shaped sample of dimensions approximately 1.5 mm by 3.0 mm ×20 mm prepared as an Example I is electroplated at ambient via standard methods at a current density of 50 milliamperes per square centimeter with nickel to a thickness of approximately 1000A on the ends and in two parallel strips on one side of the sample. The two metallic strips have a width of approximately 0.5 mm and are positioned to be approximately 5 mm from either end. Standard two and four terminal direct current resistance measurements are made at ambient. The four probe resistance measurements allow accurate determination of the contribution of the bulk resistivity to the sample resistance between the two metallic strips. The two probe resistance measurement allows accurate determination of the contribution of the bulk resistivity to the sample resistance between the ends and the contribution of the metal-ceramic contact resistance to the total sample resistance. The difference between the apparent resistivity measured with the two terminal method and that from a measurement with the four terminal method is the total contact resistance of the contacts at the 1.5 mm by 3.0 mm ends of the sample. Such a sample is prepared as described and the contact resistance is found to be negligible (less than 10% of the apparent sample resistivity). The sample with electrodes is heated in air at 400° C. for 15 hours and cooled to ambient whereupon a second measurement of the contact resistance is made and again found to be negligible. Reheating the sample and electrodes to 500° C. for 15 hours with subsequent remeasurement of the contact resistance at ambient shows negligible contribution. A third heat treatment in air at 600° C. for 15 hours with subsequent remeasurement of the contact resistance at ambient shows a measureable but still negligible contact resistance of approximately 0.02 (ohm-cm$^2$). Similar behavior is noted for samples prepared and tested in this fashion but where electrodeposited chromium is substituted for the nickel.

We claim:

1. An improved electrically conductive current collector suitable for use in high temperature applications in the presence of corrosive environments, comprising:
   (a) a high strength, noncorrosive electronically conductive, polycrystalline ceramic member of rutile which is doped with ionic metal species having a stablevalence in said polycrystalline ceramic of at least +5 which serves as the primary load bearing member of said current collector, said ceramic being substantially impervious to materials constituting said corrosive environment; and
   (b) a highly electronically conductive metal cladding intimately attached to a substantial portion of one surface of said ceramic member, said metal cladding having a thickness sufficiently thin to be plastically deformable in relation to said ceramic which preserves the function of said ceramic member as the primary load bearing element of said current collector and being based on the relative elastic modulus of the metal of said metal compared to that of the ceramic member, said metal cladding being adapted to direct current flow through said ceramic member and to shunt said current between said member and an external contact.

2. A current collector in accordance with claim 1 wherein at the temperature of the environment in which said current collector is employed said ceramic member has an electrical resistivity of less than about 1000 ohm-cm and said metal has an electrical resistivity of less than about 0.001 ohm-cm.

3. A current collector in accordance with claim 1 wherein at the temperature of the environment in which said current collector is employed said ceramic member has an electrical resistivity of less than about 50 ohm-cm and said metal has an electrical resistivity of less than about 0.0003 ohm-cm.

4. A current collector in accordance with claim 1 wherein at the temperature of the environment in which said current collector is employed said ceramic member has an electrical resistivity of less than about 10 ohm-cm and said cladding has an electrical resistivity of less than about 0.0001 ohm-cm.

5. A current collector in accordance with claim 1 where the dopant is selected from tantalum and niobium.

6. A current collector in accordance with claim 1 wherein said cladding has the additional chemical properties of strong adherence to said ceramic member and resistance to degradation of electrical conductance at the ceramic cladding interface.

7. A current collector in accordance with claim 6 wherein said cladding is selected from the class of highly conductive materials which are impermeable to oxidizing species in the environment in which said current collector is to be employed.

8. A current collector in accordance with claim 7, wherein said cladding is selected from the class of highly conductive materials which form a protective surface coating from said oxidizing species.

9. A current collector in accordance with claim 8, wherein said cladding is selected from the group consisting of aluminum, nickel, chromium, silicon, gold, platinum and combinations thereof.

10. A current collector in accordance with claim 7 wherein said cladding includes an outer layer selected from the group consisting of aluminum, nickel, chromium and platinum, and a thin inner layer of silicon, said inner and outer layers having intimate contact therebetween, said inner silicon layer being in intimate contact with said ceramic.

11. In an electrical conversion device of the type comprising:
(1) an anodic reaction zone containing a molten alkali metal reactant-anode in electrical contact with an external circuit; (2) a cathodic reaction zone containing a cathodic reactant comprising a molten liquid electrolyte which is electrochemically reactive with said anodic reactant and a current collector at least one surface of which is exposed to said cathodic reactant; and (3) a cation permeable barrier to mass liquid transfer interposed between and in contact with said anodic and cathodic reaction zones, said current collector being in electrical contact with both said cation-permeable barrier and said external circuit, wherein the improvement comprises:
employing as said current collector in said device the current collector defined in claim 1, said current collector being disposed within said cathodic reaction zones such that said ceramic member but not said metal cladding is exposed to said molten cathodic reactant.

12. An electrical conversion device in accordance with claim 11 wherein said current collector also serves as a container for said cathodic reactant.

13. An electrical conversion device in accordance with claim 12 wherein said container is a cylinder, the inside surface of which is said ceramic member and the outside surface of which bears said metal cladding.

14. An electrical conversion device in accordance with claim 11 wherein said current collector is tubular or cylindrical in configuration with the exterior of said tube or cylinder comprising said ceramic member and the interior of said tube or cylinder bearing said metal cladding, said current collector being immersed in said cathodic reactant such that said ceramic member but not said metal cladding is exposed to said cathodic reactant.

15. An electrical conversion device in accordance with claim 11 wherein a cylindrical or tubular container has disposed internally thereof a tubular or cylindrical cation permeable barrier such that a first reaction zone is located internally of said cation permeable barrier and the second reaction zone is located between the inside wall of said cylindrical or tubular container and the outer wall of said tubular or cylindrical cation permeable barrier.

16. An electrical conversion device in accordance with claim 15 wherein said first reaction is the anodic reaction zone, the second reaction zone is the cathodic reaction zone and said container is said current collector.

17. An electrical conversion device in accordance with claim 15 wherein said first reaction zone is said cathodic reaction zone, said second reaction zone is said anodic reaction zone and said current collector is tubular or cylindrical in configuration with the exterior of said tube or cylinder comprising said ceramic member and the interior of said tube or cylinder bearing said metal cladding, said current collector being immersed in said cathodic reactant such that said ceramic member but not said metal cladding is exposed to said cathodic reactant.

18. An electrical conversion device in accordance with claim 11 wherein said anodic reactant is sodium and said cathodic reactant comprises molten polysulfide salts or a mixture of sulfur and sulfur saturated molten polysulfide salts.

* * * * *